Aug. 2, 1938.   H. N. GILBERT   2,125,274
PROCESS AND APPARATUS FOR THE PREPARATION OF SOLUTIONS
Filed April 19, 1935
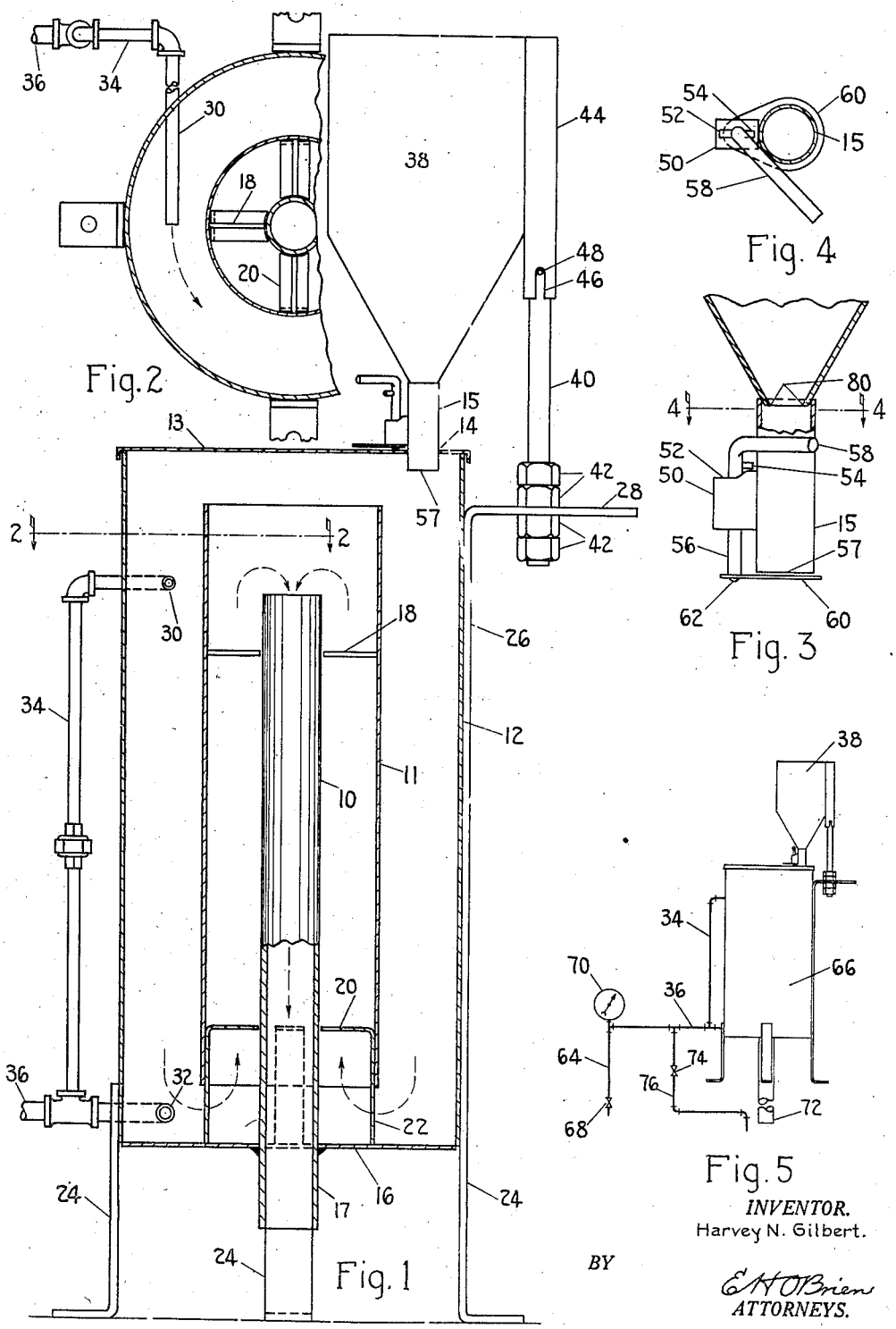
INVENTOR.
Harvey N. Gilbert.
BY
E. H. O'Brien
ATTORNEYS.

Patented Aug. 2, 1938

2,125,274

UNITED STATES PATENT OFFICE 2,125,274

PROCESS AND APPARATUS FOR THE PREPARATION OF SOLUTIONS

Harvey N. Gilbert, Niagara Falls, N. Y., assignor to E. I. du Pont de Nemours & Company, Wilmington, Del., a corporation of Delaware Application April 19, 1935, Serial No. 17,363

7 Claims. (Cl. 23—268)

This invention is concerned with a process for preparing solutions and an apparatus by which that process may be carried out. More particularly it relates to a method and apparatus for the preparation of solutions of solid materials in liquids.

Commercially it is very often desired to prepare solutions of solid materials in liquids rapidly and efficiently. Many solids are soluble in a liquid such as water only with considerable difficulty. Still other solid materials may be quite soluble if in flake or very finely divided form, but if in the form of granules go into solution only with considerable difficulty. Moreover, while other solid materials in particle, flake, or finely divided form may be brought into solution if vigorously stirred, frequently this causes a rise in temperature which is objectionable. In any event even solids which are quite soluble in the liquid being used are frequently brought into solution only after being stirred for a fairly substantial period of time. If the liquid is not agitated it may take much longer for the material to go into solution.

Specifically in the preparation of bleaching solutions comprising the solid peroxygen compound, sodium peroxide, dissolved in water or in an acidic solution, difficulty is very frequently experienced in causing the solid particles to dissolve rapidly enough. Sodium peroxide, or sodium peroxide in admixture or conjunction with other materials, is a frequently used bleaching agent.

Sodium peroxide, or sodium peroxide in conjunction or admixture with other materials, is ordinarily quite soluble in water or in water containing an acid or acidic ingredients if the mixture is thoroughly agitated, but this ordinarily brings about a substantial rise in temperature with attendant objectionable losses in active oxygen. It is accordingly one of the objects of this invention to develop a satisfactory process and an apparatus for carrying out that process which will permit the sodium peroxide to be brought into solution rapidly and without any objectionable loss in the active oxygen content of the bath resulting.

It is desired to point out, however, that this problem is not peculiar to sodium peroxide alone but is present in other circumstances in which it is desired to prepare solutions of solids which do not go into solution in a liquid with sufficient rapidity to meet commercial requirements. The process and apparatus herein disclosed are of broad general application and are useful wherever solids are to be brought into solution in liquids. In the ensuing disclosure, while I refer specifically to sodium peroxide in solution in water or mixtures including sodium peroxide in solution in water or an acidic liquid, it should be borne in mind that the method and device are equally useful wherever other solids and liquids are to be utilized in the preparation of solutions.

It is one of the objects of this invention to develop a method which will permit the rapid solution of a solid such as sodium peroxide, or a mixture including sodium peroxide, in an aqueous or acidic medium when making up solutions such as commercial bleach baths. In order that the process may be effectively carried out another object of this invention involves the construction of an apparatus especially designed for the purpose of rapidly preparing solutions of solids in liquids. Moreover, when sodium peroxide or mixtures including sodium peroxide as one ingredient are involved, it is an object of this invention to bring said compound into solution rapidly without the development of local overheating which might result in objectionable losses in active oxygen. These and still further objects of my invention will be apparent from the ensuing disclosure.

In dissolving solids such as sodium peroxide which are sometimes supplied in finely divided form and containing dust, the operation of adding the material to a liquid causes dust to escape into the air with consequent annoyance to the workmen and possible damage to material in the vicinity. This apparatus prevents any dust from escaping to the outside air and in fact draws room air into the openings in the cover by reason of the vortex created in the inner discharge pipe.

It has been found that if the solid material in lump form or flake form is fed into an enclosed compartment where it comes into contact with a stream of water which travels circumferentially of the apparatus at a relatively high velocity the product will go into solution much more rapidly than if it is conveyed into a static body of water or into a stream of water having but a small speed of flow. Moreover, under these circumstances the temperature of the solution does not rise appreciably and if a solid such as sodium peroxide is being utilized, losses in active oxygen do not occur. Accordingly, with this requirement for rapid solubility in mind my novel process will be described with reference to the enclosed drawing illustrating a form of apparatus suitable for carrying the novel process into effect. It must be remembered, however, that the method may be practiced with other forms of apparatus and I do not wish to be restricted to the special form herein illustrated and described.

Referring to the enclosed drawing, Fig. 1 represents a view partly in section and partly in elevation illustrating a complete assembly of my novel device for the preparation of solutions, including the supply hopper from which the solid compound which is to be brought into solution is fed.

Fig. 2 is a partial view in section taken along the line 2—2 of Fig. 1.

Fig. 3 is a detail view illustrating the bottom of the hopper and the closure element by which the outlet is closed when solid material is not being supplied to the dissolving mechanism proper.

Fig. 4 is a sectional view taken along the line 4—4 of Fig. 3 and illustrating various details of the hopper nozzle closure construction.

Fig. 5 is a schematic view illustrating how the novel dissolving mechanism with its auxiliary supply hopper may be connected in circuit with the liquid supply and with the conduit leading to the bleach bath or other receptacle when the device is in operation.

The novel dissolving device consists essentially of three concentric cylindrical members 10, 11 and 12. They may be formed of stainless steel, brass, bronze, or some other suitable structural material. As shown, the outer eccentric cylinder 12 is closed at its upper end by a cover 13 which is pierced at 14 for the introduction of the hopper inlet nozzle 15. The bottom of cylinder 12 is formed by bottom plate 16 through which the lower portion 17 of the innermost concentric cylinder extends. The lower part 17 of innermost concentric cylinder 10 is secured to the bottom plate 16 by welding, which rigidly secures the innermost cylinder in spaced relation to the outermost cylinder.

Innermost cylinder 10 is in form a long pipe and from it is supported the intermediate concentric cylinder 11. At the upper end of the pipe the four supporting members 18 constitute a spider holding the intermediate cylinder in spaced relation from the innermost cylinder at this point. At the lower end the intermediate cylinder is supported by the spider members 20 having bent-over portions 22 which rest against the bottom plate 16. These bent-over portions 22 may be welded or riveted to the lower end of the intermediate cylinder 11. It is evident that a rigid and compact assembly results in which three concentric cylinders forming essential parts of the apparatus are maintained in spaced relation, one with respect to the other, by the supporting members 18 and 20. The various elements are designed with sufficient strength to resist the stresses developed by the force of the flowing water or other liquid used in preparing the solutions.

At the bottom of the device and secured to the outer surface of the external or outermost concentric cylinder 12 are provided three supporting legs 24 which serve to maintain the concentric cylindrical assembly in a somewhat elevated position above the surface of the floor or table on which the device stands. These legs may be secured to the outermost cylinder 12 by welding or riveting. As illustrated, one of the three legs 24 is extended upwardly throughout almost the entire height of the outer cylinder 12, the extending portion being designated by the numeral 26. The element 24 may conveniently be welded to the surface of the cylinder 12. At the upper end it is provided with a bent-over portion 28 which functions to support the hopper member forming an element of the completed assembly which will be presently described.

Supply pipes 30 and 32 are provided for the introduction of water or other liquid used in the preparation of the solution. The pipes enter through openings formed in the outermost cylinder 12 and extend in a direction which is generally a chord of the circle forming the cross sectional outline of the cylindrical member. The arrow in Fig. 2 indicates the direction in which the water, upon emerging, flows from pipes 30 and 32 through the dissolving device. In practice I have found it most convenient to supply the greater portion of the water or other liquid by means of the lower pipe 32. The upper pipe 30 functions principally to supply a head of liquid which will cause a positive flow through the apparatus to occur in the event that the water issuing from the lower pipe merely swirls around spirally or circumferentially in the apparatus without flowing out through the outlet pipe or innermost cylinder 10. The upper pipe may, under some circumstances, be omitted and under other circumstances a whole series of pipes positioned at various heights along the outermost cylinder wall may be used. As shown in Figs. 1 and 2 when two pipes are used, a branch supply pipe 34 supplies the liquid to the discharge pipes or discharge nozzles 30 and 32 from the main conduit 36.

Adjacent to the upper end of the concentric cylinder assembly is the supply hopper 38 in which the solid material to be dissolved by contact with the spirally travelling stream of water within the concentric cylinder arrangement just described is stored. The hopper 38 is supported from the bent flange 28 of the metal strip 26 by means of rod 40. This rod is securely held with respect to the extending flange member 28 by means of nuts 42 which are threaded thereon.

Hopper 38 is provided with an attached cylindrical sleeve portion 44 which is adapted to fit over and slide on the rod 40. The lower portion of this sleeve portion is slitted as shown at 46 providing a slot in which pin 48 secured to the rod 40 is adapted to slide. When the pin 48 is securely held in the slot the hopper is prevented from sliding down any further and it is also held against displacement due to rotation with respect to the rod 40.

As previously stated hopper 38 is provided with a discharge outlet or nozzle 15 connecting the upper or storage portion of the hopper with the outlet 57. The lower end of the hopper is somewhat conical in shape and acts as a funnel to supply discharge spout 15. The outlet of discharge nozzle 15 is provided with a closure member illustrated in greater detail in Figs. 3 and 4 and which will presently be further described. As shown in Fig. 3 when hygroscopic solids are utilized in the apparatus the junction of the conical portion of the hopper and the discharge nozzle portion is constructed in a special way to prevent jamming of the apparatus. This will presently be described in detail. When the device is not in use and it is not desired that solid material flow out of the hopper 38 through the nozzle 15 into the concentric cylinder dissolving apparatus, the hopper is raised so that its lower end is entirely free of the upper cover plate 13. This means that pin 48 no longer rests in slot 46 and the hopper is supported by closure plate 60 which is swung over to close the outlet 57 of discharge nozzle 15. This plate 60 bears against the top of cover plate 13 and also closes the aperture 14 in that place.

In order to insure a constant even flow of certain powdered material from the hopper it may be necessary to apply agitation to prevent bridging of the finely divided material in the hopper. This may be conveniently accomplished by attaching a mechanical vibrator to the support 28. For this purpose an electrical vibrator or a vibrator driven by compressed air or any other suitable vibrator may be employed.

When it is desired that the device be placed in service, the water or other liquid is permitted to flow into the concentric cylinder arrangement by opening the valves leading to pipes 30 and 32. Closure plate 60 closing the opening 57 is swung away by rotating the handle 58 and this permits the nozzle 15 and hopper to slide down into the aperture 14, especially provided therefore in the top of the closure plate 13. When no more of the solution is to be prepared the hopper 38 is lifted so as to be entirely clear of the opening 14 in cover plate 13 and the closure plate 60 closing the opening 57 is simultaneously swung over to prevent egress of the solid material through the hopper. The hopper is then supported as previously described by plate 60 bearing against cover plate 13.

The mechanism for closing the outlet 57 of discharge nozzle 15, and its operating members and associated mechanism, will now be described. As shown in Figs. 3 and 4 it includes an apertured block 50 which is securely held as by welding to the exterior of the outlet spout 15. The upper end of this block is shaped so as to provide a cam surface 52 on which a pin 54 is adapted to slide. This pin 54 is inserted in rod 56 which extends through the aperture in the block 50 previously referred to. The upper end of rod 56 is bent as at 58 to form a handle which may be grasped.

At the lower end of the rod 56 is attached the closure plate 60 which stops off the bottom or outlet end of the discharge spout. This closure plate may be secured to the lower end of the rod by welding or by some other means of attachment and a bead of metal 62 should be positioned as illustrated immediately below the axis of rod 56. This metallic bead bears against closure plate 13 and serves as a bearing when rod 56 is rotated with respect to the cover plate by moving handle 58. The provision of this bead of metal is important for otherwise the flat surfaces would bear against each other and stick when plate 60 is rotated.

When the hopper 38 and its spout 15 are lowered, by rotating plate 60 permitting the spout to drop into the aperture 14 provided for it in cover plate 13, it is obvious that pin 54 in rod 56 slides downwardly on the cam surface 52. As the hopper drops down, the rod 56 slides longitudinally in the apertured block 50 so that at the conclusion of the step the closure member assumes the position indicated in Fig. 1 of the drawing. The handle 58 and pin 54 are raised free of the assembly. When it is desired to shut off the flow of material to the dissolving mechanism proper, hopper 38 is lifted, as previously stated, and closure plate 60 is swung over by rotation of handle 58 so as to close the opening 57. As the plate is swung into position the pin 54 rides upwardly on the cam surface 52 and this brings the plate tightly up against the lower portion of the discharge spout 15. This functions as a locking operation, the pin and cam serving to press the plate firmly against the discharge outlet 57 and so to prevent the escape of any additional solid material.

Fig. 5 shows an arrangement for connecting the dissolving mechanism in a circuit including as elements means for supplying the water or other liquid to the dissolving mechanism and means for conveying the resulting solution to a bleach bath or other receptacle provided to receive it. In this schematic drawing numeral 66 represents the entire concentric cylindrical dissolving device with hopper 38 secured thereto. Pipes 34 and 36 are in the same relative position as shown in Fig. 1. Supply pipe 36 is connected with the main water pipe 64 in which is located control valve 68 for controlling the supply of water to the mechanism. If desired, a gauge 70 may be provided to indicate the fluid pressure in that portion of the circuit. The water is then permitted to flow into apparatus 66 where the solution is prepared. It then flows outwardly through innermost concentric cylinder 10 and thence through the supply pipe 72 in circuit with the bleach bath.

After a sufficient quantity of solution has been prepared, valve 68 is closed and valve 74 opened. This valve is in pipe line 76 which also leads to the bleach bath. In this way the apparatus is drained by pipe 76. When additional solution is to be prepared valve 74 is closed and valve 68 opened permitting the water to flow through the apparatus. Then hopper number 38 is lowered, cover plate 60 being swung to permit the entry of solid material to the concentric cylindrical dissolving mechanism 66.

As illustrated in Fig. 3 the cross sectional area of the hopper 38 at its lower or conical end is less than the cross sectional area of the aperture 57 or of the discharge nozzle 15. This is accomplished by extending the side portions 80 of the conical portion of the hopper inwardly a sufficient distance to form a slight constriction. Nozzle 15 is attached to the conical portion by welding and presents a greater cross sectional area than that of the constricted outlet of the hopper. In this way when hygroscopic materials are being fed from the hopper a cushion of dry air is maintained around the flowing solid during the period after its emergence from the hopper outlet and before it flows into the dissolving mechanism proper through outlet 57 of the discharge spout 15. If this cushion of air is not maintained, when hygroscopic materials are fed from the hopper, due to the absorption of moisture, the solid material will agglomerate and form a solid mass which will completely choke off the feed. We have found that, in general, the diameter of the outlet from the hopper should be from 10 to 25% less than the diameter of the discharge nozzle outlet. Thus, I have found that if the nozzle 15 is formed of 1 inch pipe, the diameter of the opening from discharge hopper 38 may conveniently be about 5/8 inch. In general the relative sizes should be proportioned in accordance with the desired speed of flow of the solid material, the relative degree of hygroscopicity of the material and the length of the discharge nozzle 15. When non-hygroscopic materials are being brought into solution in the apparatus it may not be necessary to provide a constriction in the hopper outlet so as to provide a cushion of dry air, as described, to prevent the flowing solid from caking. However, when sodium peroxide is being handled it has been found desirable to provide the cushion of dry air indicated.

The operations taking place within the dissolver 66 will be apparent even from a cursory examination of the device. As indicated, the solid material drops in through outlet 57 into the apparatus proper where it comes into contact with the streams of water issuing from the nozzles 30 and 32. The water travels spirally and at high velocity circumferentially through the apparatus. As the liquid flows in, it rapidly fills up the spaces between the intermediate and outer cylinders and between the intermediate and inner cylinders and results in a solid block of water which rotates circumferentially in a rapid swirling motion. This spiralling column of water is produced before the solid material is allowed to drop in. When the solid material flows into the column the solid particles or flakes are prevented from flowing out of the space between the intermediate and outer cylinders by the centrifugal action of the rotating column of water until they have been dissolved. This is an essential characteristic of the process, and the apparatus provides positive means for preventing the solid material from going through the apparatus without becoming dissolved in the liquid. This is accomplished entirely by the centrifugal action of the swirling column of liquid itself. When the material is brought into solution, the solution flows upwardly into the annular space between the innermost cylinder 10 and the intermediate cylinder 11, the dotted arrow in Fig. 1 indicating its course. Similarly it again overflows downwardly into the innermost cylinder or discharge pipe 10, the arrows at the upper end of this discharge pipe in Fig. 1 indicating its course. The members 20 and 18 do not constitute any impediment to the flow for they occupy but a small portion of the space within the apparatus. Upon emerging from the lower portion 17 of the discharge pipe 10 this solution is conveyed to the bleach bath or other receptacle provided to receive it.

An essential characteristic of my process resides in bringing the solvent into contact with the solid material to be dissolved while it travels at a relatively high velocity and under such circumstances that the liquid travels circumferentially of the apparatus or generally in a spiral or circular direction. This causes the solid to go into solution very rapidly in the solvent. The solid particles are prevented from flowing out of the annular space between cylinders 11 and 12 until they go into solution, by the centrifugal action of the stream of water itself, which tends to force the solid particles outwardly in the annular space and away from the exit at the lower portion of cylinder 11. Thus it is evident that positive means are provided for insuring the complete solution of the solid in the liquid and the process of solution is an efficient and rapid one.

Although my invention has been described with reference to sodium peroxide in flake or granular form as a solid material and water as the liquid, it is to be understood that these materials have been taken merely as illustrative. The invention is not restricted to the preparation of solutions of any particular sort or to the preparation of solutions of solid materials where the solid is in any particular form, such as in the form of flakes or granules. There is nothing inherent in my invention which requires that it be restricted to any particular solvent or to any particular solid. While my invention may attain a high degree of usefulness in the preparation of bleach baths it is to be understood that it is also useful wherever solutions of any sort of a solid in a liquid are to be prepared.

I claim:

1. An apparatus for preparing solutions of solids in liquids which comprises, in combination, means for feeding the solid to be dissolved into a vessel in which it will come into contact with said liquid, a plurality of directive members having curved directive surfaces between which said solid is introduced, a conduit adapted to deliver a stream of said liquid between said directive members in a direction generally paralleling the curved directive surfaces of said members at the point of introduction of said stream, whereby said stream of liquid is caused to move in a generally curvilinear direction, the individual particles of said solid being prevented from emerging from said vessel until dissolved by the centrifugal force of said curvilinearly moving stream of liquid, and an outlet pipe positioned interiorly of said directive members for removing the resulting solution.

2. An apparatus for preparing solutions of solids in liquids which comprises, in combination, a generally cylindrical container, a second cylindrical member positioned within said container, said cylindrical elements being arranged so that their surfaces form curved directive surfaces, a centrally located outlet pipe within said second cylindrical member, means for supplying said solid material into the space between said cylindrical container and said second cylindrical member, and a conduit for said liquid provided with a discharge end, said discharge end being positioned between the curved directive surfaces of said cylindrical elements so as to cause said stream of liquid, after emerging from said conduit, to come into contact with the curved directive surfaces so that said stream is caused to flow in a generally circumferential direction.

3. An apparatus for preparing solutions of solids in liquids which comprises an external container, an intermediate member serving as a baffle, an interior member positioned interiorly of both said external container and said intermediate member, said interior member functioning to withdraw the resulting solution and acting as an overflow pipe, and a conduit adapted to deliver a stream of liquid between said external container and said intermediate member in a direction such that said stream of liquid is guided by the surfaces of said external container and said intermediate member so that it flows in a generally curvilinear direction.

4. An apparatus for preparing solutions of solids in liquids which comprises, in combination, a cylindrical container, a hopper secured in operative relationship with respect to said container, means for feeding solid material contained within said hopper into the space within the interior of said container, means for bringing said liquid into contact with said solid material, a curved directive member positioned within said container, a conduit so positioned as to deliver a stream of liquid into said container in a direction whereby said stream of liquid contacts with said curved directive member and is so caused to rotate in a generally circumferential direction, said solid material being prevented from being carried out of said space within said container until it has completely gone into solution as a result of the centrifugal force of said circumferentially moving stream of liquid, and an outlet pipe positioned within said cylindrical container interiorly of said curved directive member for removing the resulting solution.

5. An apparatus for preparting solutions of solids in liquids which comprises in combination, an apertured housing member, a hopper secured in operative relationship with said housing member and having a discharge nozzle adapted to extend through the aperture in said housing member, an interior member positioned within said housing member providing a baffle to prevent liquid flow into the portion of said housing member within said interior member except through specially provided openings in said interior member, solution outlet means positioned within said interior member and serving to permit withdrawal of the resulting solution from said housing member and a conduit adapted to deliver a stream of liquid within said housing member so as to effect contact of said liquid with the surfaces of said housing and baffle members in such a direction as to cause said liquid to rotate in a generally curvilinear direction within said housing member.

6. An apparatus for preparing solutions of solids in liquids which comprises three cylindrical members positioned in concentric relationship, closure means for closing the bottom of two of said concentric cylinders, means for supplying a current of liquid to the space between said outer and said intermediate cylinder, said last named means being positioned so as to discharge a stream of liquid in such a direction that said stream comes into contact with the curvilinear walls of said concentric cylinders and is thus caused to flow in a generally curvilinear direction, and means for permitting the resulting solution to flow from the space between said outermost and intermediate cylinders to the space between said innermost and said intermediate cylinders, said innermost cylindrical member being provided with an open upper end so that solution rising within said space between said innermost cylindrical member and said intermediate cylinder will overflow into said innermost cylindrical member and an open lower end so that said solution after flowing thru said innermost cylinder will emerge from the apparatus.

7. A method for preparing solutions of solids in liquids which comprises, feeding a stream of liquid into a relatively stationary body of said liquid in such a direction as to cause the resulting liquid body to move in a generally curvilinear direction, feeding a solid in powdered form into said curvilinearly moving body of liquid, maintaining a second body of liquid positioned interiorly of said curvilinearly moving body of liquid, and causing liquid to flow from said curvilinearly moving body of liquid into the lower portion of said innermost body of liquid, the rate of curvilinear travel of said first named body of liquid being such as to prevent said solid from moving out of contact with said curvilinearly moving body and into said innermost body of liquid until said solid has been substantially completely dissolved in said liquid.

HARVEY N. GILBERT.